Figure 1A:
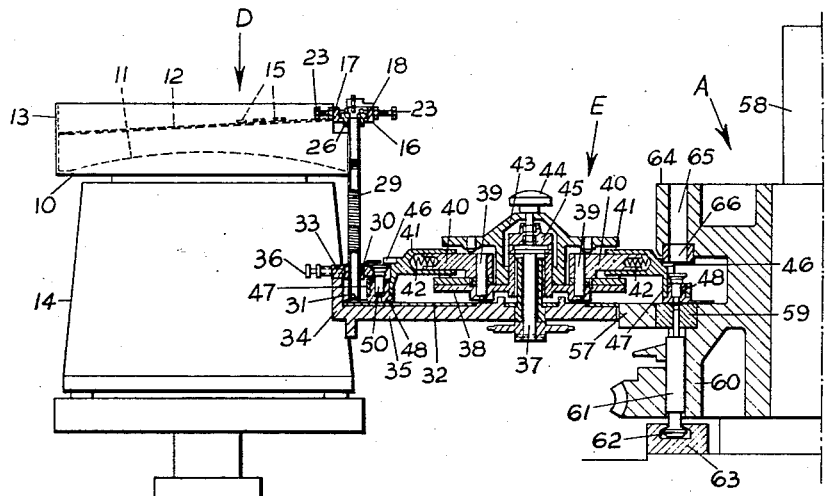

Dec. 27, 1960   F. T. STOTT   2,966,125
MACHINES FOR THE PRODUCTION OF COATED TABLETS AND THE LIKE
Filed Feb. 12, 1958   4 Sheets-Sheet 1

INVENTOR
Frank Thomas Stott.
By Rosser Ross. Attys.

Dec. 27, 1960 F. T. STOTT 2,966,125
MACHINES FOR THE PRODUCTION OF COATED TABLETS AND THE LIKE
Filed Feb. 12, 1958 4 Sheets-Sheet 2

INVENTOR
Frank Thomas Stott
BY Ross & Ross Attys.

Dec. 27, 1960 F. T. STOTT 2,966,125
MACHINES FOR THE PRODUCTION OF COATED TABLETS AND THE LIKE
Filed Feb. 12, 1958 4 Sheets-Sheet 3
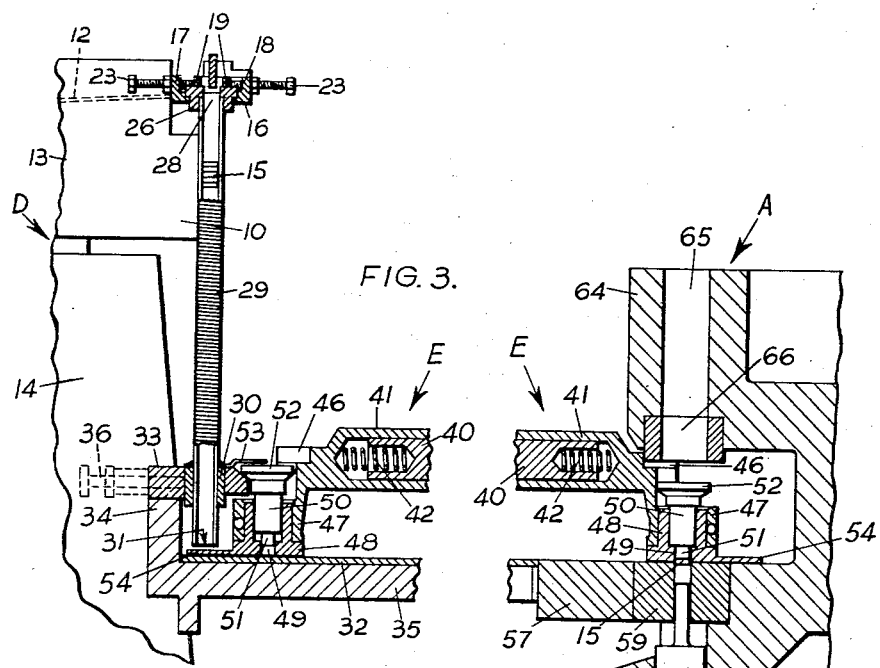
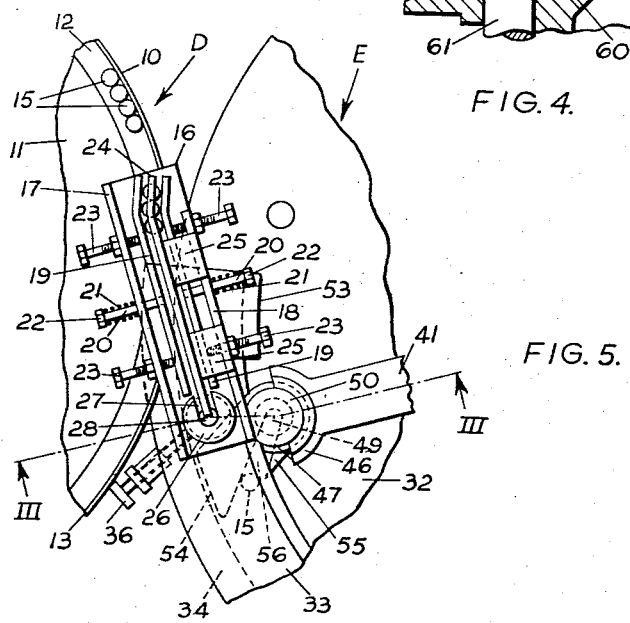
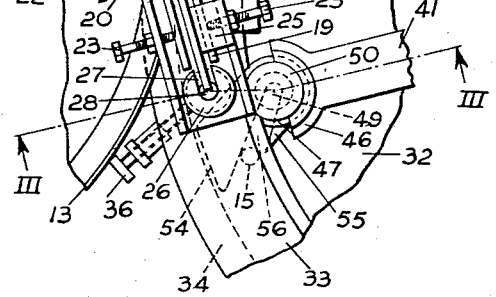
INVENTOR
Frank Thomas Stott.
BY Ross + Ross. Attys.

Dec. 27, 1960  F. T. STOTT  2,966,125
MACHINES FOR THE PRODUCTION OF COATED TABLETS AND THE LIKE
Filed Feb. 12, 1958  4 Sheets-Sheet 4

INVENTOR
Frank Thomas Stott.
By Rossi Ross, Atty.

United States Patent Office 2,966,125
Patented Dec. 27, 1960

2,966,125

MACHINES FOR THE PRODUCTION OF COATED TABLETS AND THE LIKE

Frank Thomas Stott, Rochdale, England, assignor of one-half to John Holroyd & Company Limited, Milnrow, England Filed Feb. 12, 1958, Ser. No. 714,821

Claims priority, application Great Britain Feb. 19, 1957

1 Claim. (Cl. 107—1)

This invention relates to machines for the production of coated tablets and the like, that is to say any relatively small articles, produced from comminuted powder by pressure and subsequently provided with one or more outer layers, also by pressure, which are similar to tablets and may be known as coated pills, lozenges, charges or by other similar titles.

In the specification of prior Patent No. 2,849,965 dated September 2, 1958, is described and claimed a machine for producing such coated tablets which comprises a rotary tablet core making mechanism which serves to produce tablet cores, a rotary coating mechanism for applying a coating to each of the tablet cores, and a transfer mechanism which serves to transfer the tablet cores to the coating mechanism. The transfer mechanism serves to cause each tablet core to be brought into alignment with and to move in an arcuate path above a corresponding die in the coating mechanism for a period during which the tablet core is transferred to its die, this arrangement serving to ensure accurate positioning of the tablet core in the coating die so that the subsequent coating or outer layer provided thereon is of substantially uniform thickness.

The present invention is based upon the appreciation that the transfer mechanism aforesaid can be employed, not only for transferring tablet cores from a core-making mechanism, but can equally well be used for transferring pre-made cores to a coating mechanism; and also that by suitable modification of the machine described and claimed in the specification of the aforementioned patent coated tablets having two or any practical number of layers surrounding the core can be produced.

According to the invention a machine adapted for the production of coated tablets and the like having a coating of uniform thickness comprises a transfer mechanism for transferring formed tablet cores to a coating mechanism and locating said tablet cores in continuous succession in dies in said coating mechanism, in which the said transfer mechanism and the said dies are each continuously circulating in a manner such that each tablet core is centrally located and centrally retained in a die.

More particularly according to the invention, a machine adapted for the production of coated tablets and the like having a coating of uniform thickness comprises a transfer mechanism for transferring tablet cores to a coating mechanism and locating said tablet cores in continuous succession in dies in said coating mechanism, in which the said transfer means and the said dies are each continuously circulating in such a manner as to enable each tablet core to follow a superimposed path geometrically identical with the path followed by the said die at an identical speed therewith for a finite period sufficient to enable the tablet core to become free of restraints imposed by the transfer means.

A preferred form of the machine aforesaid comprises feeding means for feeding tablet cores, and a transfer mechanism including one or more core-receiving pockets for transferring said cores, one at a time, to a travelling coating mechanism which includes a plurality of coating dies, the said transfer mechanism being adapted to co-operate with said coating mechanism so that each pocket thereof travels in alignment with a respective coating die for a distance sufficient to permit transfer of a core from the pocket to the die.

As described in the aforementioned patent, the coating mechanism may be rotary, as also may the transfer mechanism, and this latter preferably comprises a plurality of radially disposed yieldable arms, these arms each having a core pocket at their outer ends and a fork-like member adapted to engage bosses associated with the coating dies of the coating mechanism so as to cause the pockets to travel in alignment with the dies as aforesaid.

In order to permit production of tablets which each comprises a core having two layers provided thereon, the machine according to the invention may further include a second transfer mechanism and a second coating mechanism, the second transfer mechanism being adapted to transfer tablet cores from the first mentioned coating mechanism to the second coating mechanism.

Such an arrangement can be achieved by providing means for feeding tablet cores and an additional transfer mechanism on the machine described in detail in the aforementioned patent so as to feed the cores to the tablet core-making mechanism thereof, and modifying such core-making mechanism, as may be necessary, to enable it to act as a coating mechanism which applies a first coating layer to the tablet cores.

Figure 2A:
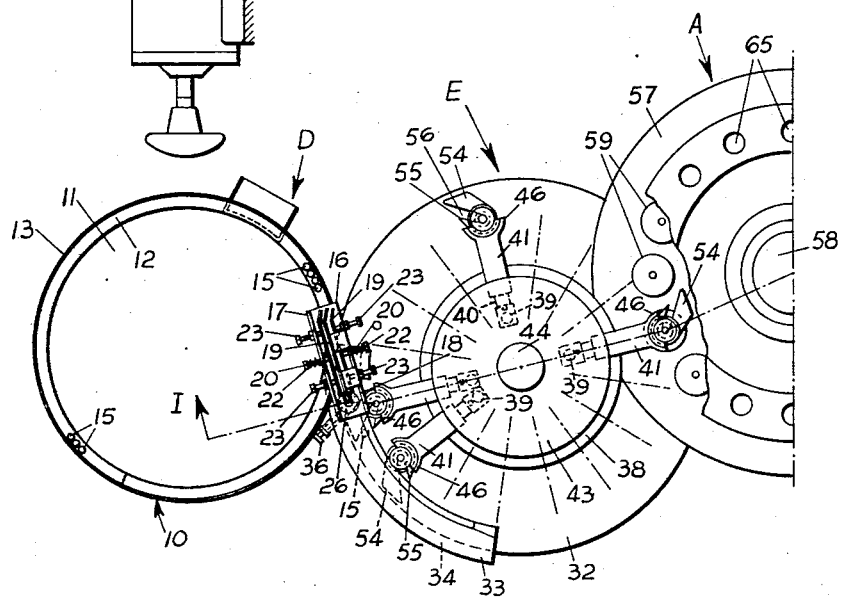
Figure 1B:
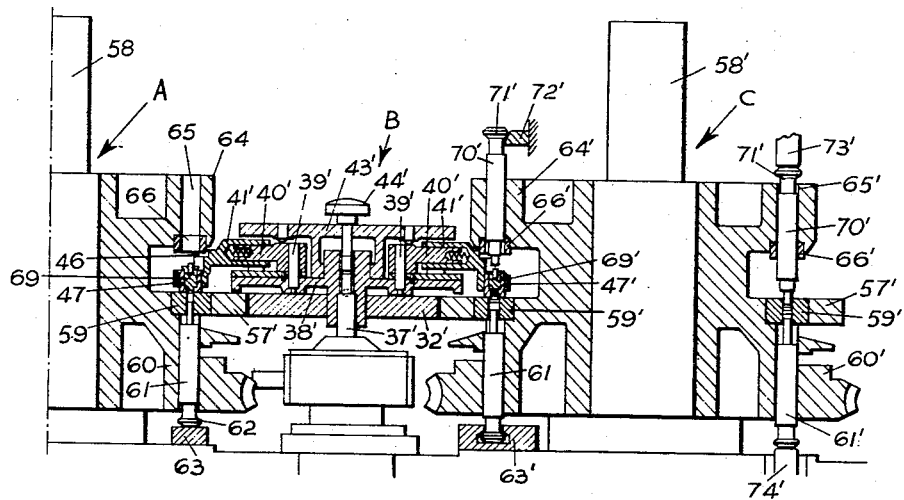
Figure 2B:
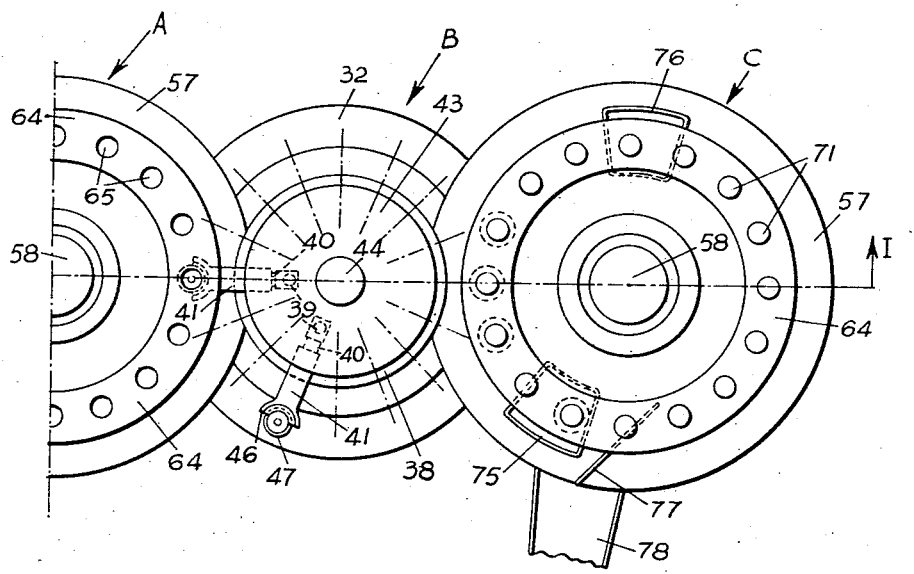
Figure 6:
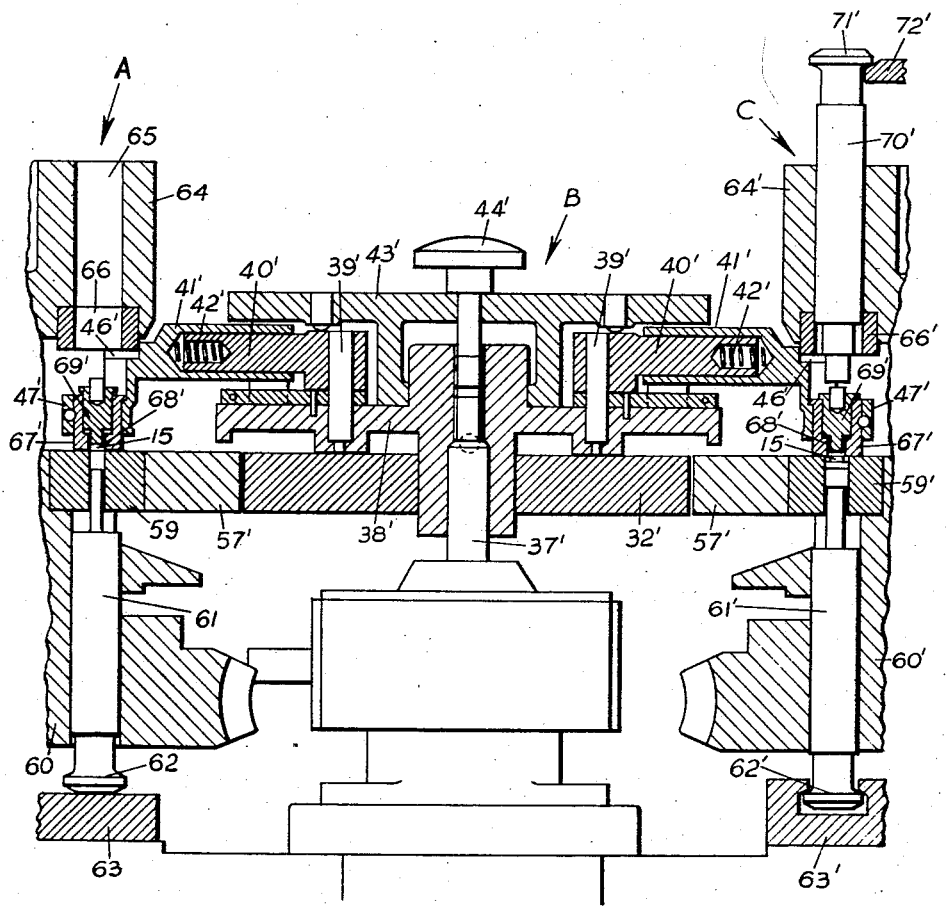

The invention will be described further, by way of example, with reference to the accompanying drawings, in which:

Figs. 1A and 1B together are a diagrammatic side elevation of a practical embodiment of machine for producing coated tablets, in accordance with the invention, the transfer and coating mechanism being shown sectionally along a section corresponding to the line I—I of Figs. 2A and 2B, Figs. 2A and 2B together are a diagrammatic plan view of the machine of Figs. 1A and 1B, Fig. 3 is a fragmentary sectional view showing certain parts of the machine which are depicted in Fig. 1A on an enlarged scale, this figure corresponding to line III—III of Fig. 5, Fig. 4 is a fragmentary sectional view showing certain other parts which are depicted in Fig. 1A on an enlarged scale, Fig. 5 is a fragmentary plan view showing certain of the parts of Fig. 2A on a larger scale, and Fig. 6 is a fragmentary sectional view showing certain of the parts of Fig. 1B on a larger scale.

The machine illustrated is adapted to apply a single coating layer to a tablet core and is constructed, basically, substantially as is described in the specification of prior Patent No. 2,849,965, dated September 2, 1958. The machine comprises a mechanism A which corresponds to the tablet core making and coating mechanism of the aforesaid patent, a mechanism B which corresponds to the transfer mechanism of the aforesaid prior patent and a mechanism C which corresponds to the coating mechanism of the aforesaid prior patent.

It further comprises a tablet core feeding mechanism D and an additional transfer mechanism E. For the sake of convenience, the mechanisms will hereinafter be referred to as follows:

D—feeding mechanism.
E—first transfer mechanism.
A—first core making and coating mechanism.
B—second transfer mechanism.
C—second coating mechanism.

The feeding mechanism D comprises an unscrambling device of known type including an open-topped cylindrical container 10 having a domed base 11 and a helical track 12 provided on the inner surface of its curved sidewall 13. A vibrator 14 supports the container 10 and acts, when tablet cores 15 are provided in the container 10, to progress such cores along the track 12, by vibrating the same. Container 10, it will be understood, is cylindrical and has a helical track around its side wall. Vibrator 14 serves to oscillate the container rotarily about its vertical axis at a very high frequency but with a very small amplitude of oscillation. The oscillation tends to move the pre-made cores up the track and on to the platform 16.

Contiguous with the track 12 and extending horizontally tangentially relative to the container 10 is a feed platform 16 (see more particularly Fig. 5). Such platform 16 is of channel-shaped cross-section, providing vertical side members 17, 18. Appropriately shaped strip-like guides 19, rest on the platform 16, each being supported by a pin 20 which projects through an aperture in the respective side members 17, 18. The bent ends of guide 19 are merely bent so as to ensure that the fed cores enter between the guides. A spring 21 surrounds each pin 20 where it projects from the side member 17 or 18 outwards, and bears at one end on a head 22 of the pin 20 and at the other end on the respective side member 17 or 18. Adjusting screws 23 engage threadedly in the side members 17 and 18 and abut the guides 19, so that adjustment of the screws 23 causes corresponding adjustment of the guides 19, according to the size of the tablet cores 15 to be coated.

A height guide 24 is supported above the platform 16 by a distance slightly greater than the thickness of a tablet core 15 upon lugs 25 (Fig. 5) provided on side member 18. At its end remote from where it meets the track 12, the platform 16 is provided with an aperture wherein is located a boss 26 having a slot 27 (Fig. 5) which registers with the passage along the platform 16 defined by the guides 19 and 24. The slot 27 of such boss 26 communicates with a vertical hole 28 (Fig. 3) in the boss 26, and the latter is connected, at its lower end, with a tube 29. Such tube 29 is formed by winding a wire spirally onto a mandrel in the form of a rod whose diameter is slightly greater than the diameter of the tablet cores 15, removing the mandrel and attaching it (e.g. by soldering) to the boss 26 and to a second surrounding boss 30 near the lower end thereof.

The tube 29 extends downwards from the platform 16 and terminates at 31 just above a circular bed 32 of the first (or core-feeding) transfer mechanism E, the second surrounding boss 30 being clamped in a cam plate 33 secured to a projection 34 provided on a base 35 whereon the bed 32 is disposed, by means of a bolt 36.

The distance between the lowermost end 31 of the tube 29 and the transfer mechanism bed 32 is very slightly greater than the thickness of the pre-made tablet core 15 to be fed thereby, so that, when the tube 29 is full of cores 15, it provides, effectively, a stack of the tablet cores 15, these being disposed on top of one another with the lowermost core 15 resting on the bed 32 and exposed at the bottom of the tube 29.

The core feed or first transfer mechanism E is mounted between the feeding mechanism D and the first core making and coating mechanism A, and has a rotary spindle 37 whereon is secured a disc 38 having a plurality of vertical pins 39 disposed at intervals therearound. Each pin 39 has located thereon a telescopic radial arm constituted by an inner part 40 and an outer part 41 slidably located thereon and loaded radially outwards by a spring 42. Such radial arms 40, 41 are capable of very limited pivotal movement about the pins 39 and are held captive on the pin 39 by means of a top cap 43 secured by a knurled screw 44 which engages threadedly into an extension 45 of the disc 38 (see Fig. 1A).

The outer part 41 of each radial arm is provided at its end remote from the inner part 40 with a forked part 46 below which is a sleeve 47 wherein is fixedly accommodated a bush 48 having a pocket 49 for receiving a tablet core 15. A weight 50 is located in the bush 48 so as to be vertically slidable therein and such has, at its lower end, a short projection 51 which will extend into the pocket 49 when such pocket 49 is empty and, at its upper end, an enlarged head 52 which will engage with the cam plate 33, so as to be raised thereby when the arm 40, 41 passes the tube 29. A guide plate 53 is provided at the leading end of the cam plate 33 and this serves to prevent the weight 50 from being jerked upwards unintentionally when it initially engages the cam plate 33.

Extending laterally from the bush 48 just above the bed 32 are two thin plate-like projections 54, 55 providing between them a channel 56 which communicates with the pocket 49. These plate-like members are thin enough to pass below the tube 29 when the arms 40, 41 are rotated around the shaft 37.

The first core making and coating mechanism A comprises a bed 57 which is flush with the transfer mechanism bed 32 and is rotatable about shaft 58. Die pockets 59 are provided at intervals around the bed 57 and mounted in suitably aligned holes in an integral skirt 60. Depending from the bed 57 are punches 61 each having an enlarged head 62 engageable with a circular cam 63 of the machine.

A second upwardly projecting skirt 64 is provided integrally with the bed 57 and this also has aligned holes 65 at the lower ends of which are secured downwardly projecting bosses 66 which are engageable by the forks 46 on the radial arms.

The second transfer mechanism B is similar to the transfer mechanism A and comprises a bed 32', shaft 37', disc 38', pins 39', telescopic arms 40', 41', springs 42', forked parts 46', sleeves 47', top cap 43' and knurled bolt 44', the functions of which are all similar to the corresponding parts of the first transfer mechanism E. Accommodated in each sleeve 47' is a bush 67', which, in contrast to the bushes 48 of the first transfer mechanism D, have no projections and are each provided only with a circular core pocket 68'. Weights 69', similar to the weights 50 are provided in each bush 67'.

The second coating mechanism C is substantially similar to the first core making and coating mechanism A and comprises a rotary bed 57' mounted on shaft 58', die pockets 59' the internal diameters of which are somewhat larger than the internal diameters of the die pockets 59 of the first coating mechanism A, lower skirt 60' wherein lower punches 61' are mounted, a cam 63', an upper skirt 64' with holes 65' therein and bushes 66' mounted at the lower ends of the holes 65'.

In contrast to the mechanism A, however, the coating mechanism C is provided with upper punches 70' in the holes 65', such punches 70' having enlarged heads 71' for engagement with a cam plate 72' and a compression roller 73'. Additionally there is a pressure roller 74' for the lower punches 61', the rollers 73' and 74' being vertically aligned.

Furthermore, the mechanism is provided with coating material feeding means comprising a bottom fill feeding station shown diagrammatically at 75' and a top fill feeding station shown diagrammatically at 76' in Fig. 2B, a tablet sweep-off plate 77' disposed just above the bed 57' between the latter and the upper skirt 64', and a chute 78' for finished tablets.

The machine as so far described, is set up to enable it to apply a single exterior coating to tablet cores 15 and the mode of operation thereof is as follows. Firstly, mechanisms E, A, B and C are set into rotation. These mechanisms are geared to one another and are synchronised. Thereafter, the vibrator 14 is energized and preformed tablet cores 15 are placed in the container 10. As has previously been described, these cores are progressed, by the vibration of the vibrator 14 along the track 12 in side-by-side horizontal disposition to the feed platform 16 into the slot 27 of boss 26, so that they fall into the tube 29 and form a stack within the tube 29 with the lowermost core 15 resting on the bed 32 of the first transfer mechanism E and exposed at the bottom of the tube 29. Because the tube 29 is made of spirally wound wire, it is of a flexible nature and consequently will not damp the vibrations of the container 10. Furthermore, the tube 29 vibrates in unison with the container 10 and as a consequence of this blockages as a result of cores 15 becoming lodged in the tube 29 are eliminated.

The arms 40, 41 of the transfer mechanism E are moving in an anticlockwise direction, as viewed in Figs. 2A and 5, about their shaft 37, and as can be seen in Fig. 5, when the arm part 41 approaches the tube 29, the extension 54 passes under such tube 29 and sweeps away the lowermost core 15. At the same time, the head 52 of the weight 50 of such arm part 41 is raised by engagement with the cam plate 33, so that as the arm part 41 subsequently moves away from the tube 29, the tablet core 15 is carried along the channel 55 until it arrives at the pocket 49 in the bush 48. Thereafter, the weight head 52 runs off the cam plate 33 (see Fig. 2A) so that the weight 50 is lowered onto the core 15 in the pocket 49 and locates same positively therein.

As the arm part 41 continues to rotate, it now approaches the first core making and coating mechanism A. In the apparatus as described such core making and coating mechanism A does not serve to apply a coating to the core, but merely receives the core and passes it on to the second transfer mechanism B for feeding to the second coating mechanism C, where a coating layer is applied thereto.

Referring now to Figs. 1A, 2A and 4, the bed 57 of the coating mechanism A is rotating in a clockwise direction as viewed in Fig. 2A, and serves to bring a die pocket 59 into register with the bush 48 of the arm part 41. As such bush 48 and pocket 59 approach each other, the forked part 46 locates with the corresponding boss 66 of the coating mechanism A to ensure accurate register, whereafter the telescopic nature of the arm parts 40, 41 permits the bush 48 to travel over the same arcuate path as is traversed by the die pocket 59 for a short distance. During this travel, the punch 61 is moved downwards by its cam 63, so that the core 15 moves under the influence of the weight 50 and without hindrance down into the pocket 59. Thereafter, the arm 40, 41 moves off the bed 57 of the coating mechanism A towards the tube 29 to take up another tablet core 15. All the arms 40, 41 act in this way, so that they serve continuously to take up cores from the tube 29 and deposit them in successive die pockets 59.

As the core making and coating mechanism A rotates is merely maintains the tablet cores in its die pockets and carries them towards the second transfer mechanism B (see now Figs. 1B, 2B and 6) which rotates in an anticlockwise direction as viewed in Fig. 2B. As die 59 containing a core 15 aprpoaches and is approached by the bush 67' of an arm 40', 41', the corresponding boss 66' is engaged with the forked part 66' of the arm part 41' in exactly the same way as with the transfer mechanism E already described, so that the core 15 is located over the pocket 59' accurately and follows the path of the latter for a finite period. During this period, the cam 63' raises the punch 61' and consequently the core 15 is displaced out of its pocket 59' upwards into the pocket 68' in the bush 67' at the end of the arm 40', 41' lifting the weight 69' very slightly. Thereafter, upon continued rotation, the die pocket 59' moves on towards the first transfer mechanism E to receive another core 15 and the arm 40', 41' sweeps the core it has just received onto its bed 32' and towards the second coating mechanism C, the weight 69' resting on the core 15 to prevent unintentional movement thereof.

A die pocket 59 moving towards the transfer mechanism B in a clockwise direction as viewed in Fig. 2 passes under the bottom fill feeding station 75 and simultaneously the bottom punch 61 thereof is lowered by the cam 63. Granular material to be compressed onto the tablet core 15 drops from the feeding station 75 to fill the die pocket 59 flush with its upper surface and provide a "bottom fill" therein, and the die 59 then moves into register with the sleeve 59, the forked part 46 of the arm locating with the boss 66 as previously described so that the sleeve 67 follows the path of the die pocket 59 for a definite period.

During this period, the punch 61 is lowered again by its cam 63 so that the core 15, under the influence of the weight 69 moves downwards into the die pocket 59, while at the same time resting on the bottom fill. Thereafter, the arm 40', 41' moves away towards the first coating mechanism A to receive another core 15, while the die pocket 59 with its bottom fill and the core 15 move towards the top fill feeding station 76, the cam 63 moving the punch 61 slightly further downwards during this movement to provide a free space in the die pocket 59 above the core 15 to receive a "top fill" of granular coating material.

As the coating mechanism C continues thereafter to rotate, the upper punch 70 which has been raised during the operations of the mechanism C so far described by the cam plate 72 is lowered so as to rest on the top fill whereafter the punches 61 are carried into simultaneous engagement with pressure rolls 74, 73 (not shown in Fig. 2B) which serve to compress the top and bottom fills around the tablet as a coating layer. This having been done, the upper punch 70 re-engages with its cam plate 72 and is raised thereby, and the lower punch 61 reengages with its cam 63 to be raised so as just to lift the completed tablet out of the die pocket 59. Thus, as the die pocket 59 passes under the plate 77, the latter will engage the tablet and deflect it into the chute 78.

Thus, it will be appreciated that the machine serves, effectively, to take the pre-made tablet cores from the container 10 and to apply a coating layer thereon at the coating mechanism C. This arrangement is most satisfactory, since the machine can, if desired, be employed to apply two layers to the tablet cores.

If such tablets having two coating layers are required, appropriately sized punches (similar to the punches 70 of the coating mechanism C) are provided in the holes 65 of the upper skirt 64 of the coating mechanism A, together with an appropriate cam plate and roll (similar to the cam plate 72 and roll 73 of mechanism C). Additionally top and bottom fill feeding stations (similar to stations 75 and 76) are provided. The coating mechanism A will then operate in exactly the same way as the mechanism C, and the finished tablets produced on the machine will have two successive coating layers.

It will be obvious, of course, that by suitable modification of the machine that a tablet having only a single coating layer can be produced using only the feeding mechanism D, the first transfer mechanism E and the first coating mechanism A.

Only minor modification of the machine illustrated is necessary to enable it to be operated to produce its own tablet cores and apply a single coating layer thereto. In this case, the pre-made core feeding mechanism D and first transfer mechanism is not used. A single granular material feed station (similar to the feed station 75) is provided on the first coating mechanism A and punches (similar to punches 70), with associated cams 72, are provided in the holes 65. The punches 70 and 61 of the mechanism A then serve to compress a single file of granular material to form a tablet core which is then passed to the second transfer mechanism B and thence to the second coating mechanism C for a coating layer to be applied thereto.

The invention is not confined to the precise details of the foregoing example, and variations can readily be made thereto. For instance, the machine could be modified to apply any desired practical number of coating layers to a tablet core, it being only necessary to provide the appropriate number of coating mechanisms and transfer mechanisms. More, the form of the transfer mechanism is not limited to the precise details shown, since any mechanism which will serve to cause the tablet cores to move in register with the coating dies during the whole of the period during which the core is transferring to or from the die can be employed with equal success.

I claim:

A sub-combination in a coated tablet machine comprising, a vibratory hopper containing a supply of preformed tablet cores, a helical conveyor track supported within said hopper for progressing a series of cores therealong in regular oriented disposition to a discharge end, a feed platform for receiving the cores from the discharge end of said track and mounted on and vibrated by said hopper, a tube having open receiving and transfer ends and being vibratable with said platform and depending downwardly from and in communication at its receiving end with said platform for receiving cores therefrom and holding them in stacked relation preliminary to discharge from said transfer end thereof, a traveling transfer mechanism including a bed spatially disposed, for a distance equal to at least the thickness of a core, beneath the transfer end of said tube for the resting thereon of the lowermost of the cores and a plurality of telescopic arms each having a pocketed extension at its outer end adapted to sweep over the bed in a plane below the plane of the discharge end of said tube, the arms of said transfer mechanism being movable in seriatim beneath said tube for sweeping the lowermost of the cores from said tube into the pocketed extension thereof.

References Cited in the file of this patent

UNITED STATES PATENTS

| 1,248,571 | Stokes | Dec. 4, 1917 |
| 2,634,022 | Wyatt | Apr. 7, 1953 |
| 2,700,938 | Wolff et al. | Feb. 1, 1955 |
| 2,718,957 | Spurlin | Sept. 27, 1955 |
| 2,849,965 | Stott | Sept. 2, 1958 |

FOREIGN PATENTS

| 759,081 | Great Britain | Oct. 10, 1956 |